United States Patent [19]

Ruble

[11] 4,059,145
[45] Nov. 22, 1977

[54] METHOD AND APPARATUS FOR CONTROLLING SURFACE TEMPERATURE

[75] Inventor: Theodore A. Ruble, Fort Worth, Tex.

[73] Assignee: Sid Richardson Carbon & Gasoline Co., Fort Worth, Tex.

[21] Appl. No.: 705,463

[22] Filed: July 15, 1976

Related U.S. Application Data

[62] Division of Ser. No. 584,190, June 5, 1975, Pat. No. 3,982,586.

[51] Int. Cl.² .................... F25B 29/00; F28F 27/00
[52] U.S. Cl. ........................................ 165/1; 62/99; 62/514 R; 165/31; 165/32; 165/39; 165/96; 165/107
[58] Field of Search .................... 165/1, 2, 104, 105, 165/106, 107, 31, 32, 39, 96, 61; 62/99, 514 R

[56] References Cited

U.S. PATENT DOCUMENTS

| 2,589,186 | 3/1952 | Alila | 165/107 |
|---|---|---|---|
| 2,608,968 | 9/1952 | Moseley | 165/107 |
| 3,165,145 | 1/1965 | Spaenig | 165/107 |
| 3,231,336 | 1/1966 | Lindberg | 165/107 |
| 3,240,675 | 3/1966 | Weber | 165/107 |
| 3,269,458 | 8/1966 | Rogers | 165/107 |
| 3,566,960 | 3/1971 | Stuart | 165/107 |
| 3,608,609 | 9/1971 | Trefny | 165/107 |
| 3,633,658 | 1/1972 | Kirschner | 165/107 |
| 3,651,865 | 3/1972 | Feldmanis | 165/105 |
| 3,776,305 | 12/1973 | Simmons | 165/107 |

Primary Examiner—Ronald H. Lazarus
Assistant Examiner—Daniel J. O'Connor
Attorney, Agent, or Firm—Vinson & Elkins

[57] ABSTRACT

A method and apparatus are disclosed for automatically controlling the surface temperature of a body by removing heat from the body with a first heat exchange liquid circulating between a heat exchanger in contact with the body and a second heat exchanger in which heat is transferred from the first heat exchange liquid to a second, more volatile, heat exchange liquid in boiling equilibrium with its vapor. The temperature of the second heat exchange liquid, and consequently the amount of heat removed from the body being cooled, is controlled by regulating the pressure in the second heat exchanger in inverse proportion to the temperature of the body being cooled. This abstract is not to be construed in any way to define or limit the invention set forth below.

2 Claims, 1 Drawing Figure

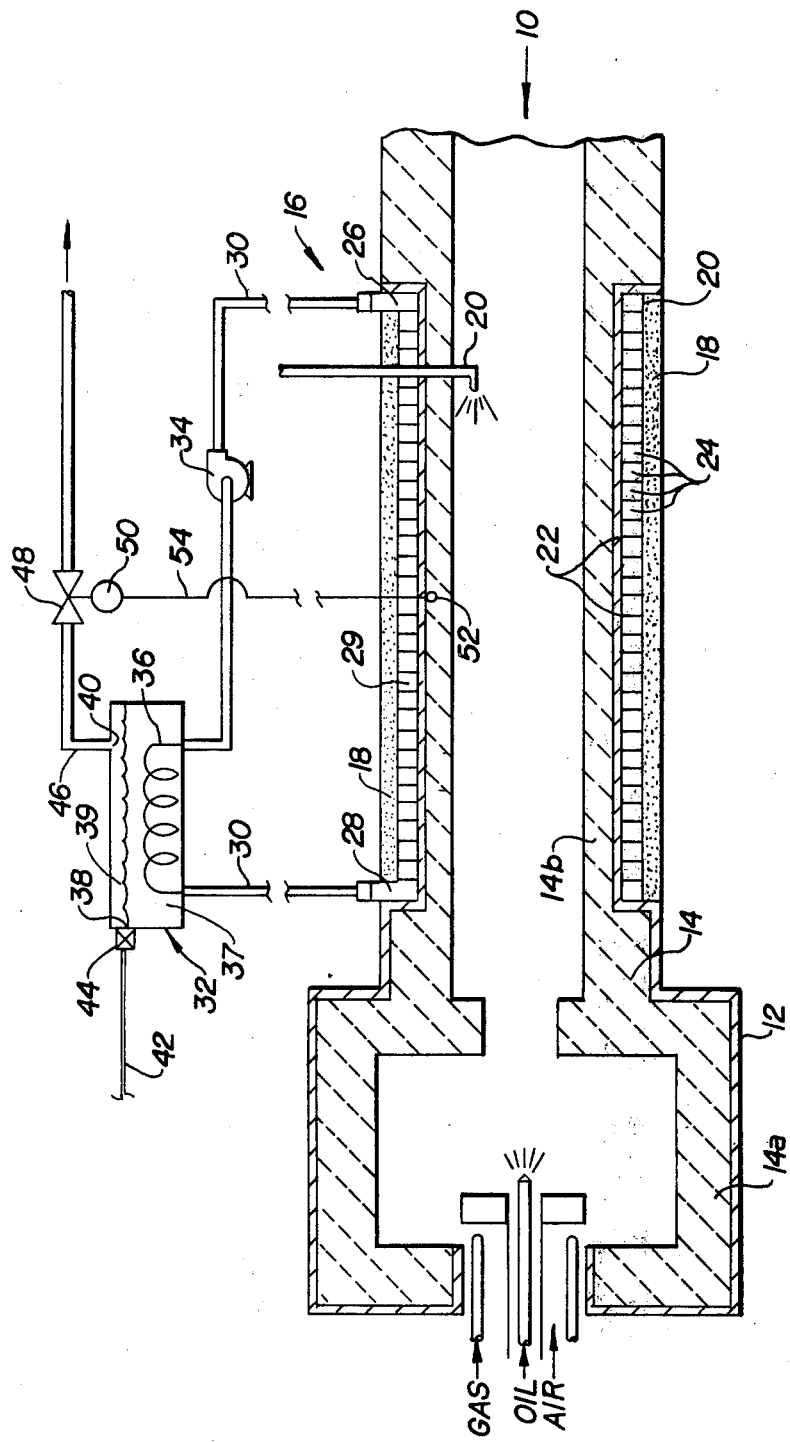

METHOD AND APPARATUS FOR CONTROLLING SURFACE TEMPERATURE

This is a division of co-pending application Ser. No 584,190 filed June 5, 1975, now U.S. Pat. No. 3,982,586.

It frequently happens in chemical processing industries, as for example, in the manufacture of carbon black, that a body such as a reactor, vessel or conduit is operated at elevated temperatures, and it is necessary or desirable to maintain the metal shell of the reactor, vessel or conduit within a given temperature range. In the case of high internal temperatures, such as the temperature range of from about 1300° to 3000° F commonly encountered in the manufacture of carbon black, the reactor or vessel is normally lined with a refractory material to protect its metal shell. The refractory for such service is very expensive to install and maintain, and if the metal shell must be kept at about 500° F or less, for economic or safety reasons, the refractory must be quite thick. Total thicknesses of a foot or more of refractory lining are not uncommon. If, however, the metal shell can be cooled to an acceptable temperature by suitably regulated heat exchange means, and if the heat which is removed from the shell can be conserved and put to use, the thickness and cost of refractory lining may be drastically reduced, and the excess heat saved rather than being dissipated to the atmosphere.

There are also cases where, although heat must be removed from the shell, the shell temperature must be maintained at a certain minimum temperature. For example, in the case of pipe conduits from carbon black reactors, where internal temperatures are 1000° F or less, the pipes are commonly uninsulated and dissipate heat at varying rates depending upon ambient air temperature, precipitation and winds. Such variations in heat removal may cause variations in removal of residual oil from the carbon black and at the lower temperatures, changes in ambient conditions may cause condensation with attendant corrosion inside the pipe conduit. Additionally, the heat lost to the atmosphere is wasted. It is therefore desirable to control removal of heat from such pipe conduits and to recover the heat removed for useful purposes. In such cases, the equipment for temperature control would remove only enough heat to permit the conduit to maintain a predetermined minimum temperature, rather than maximum.

It is well known that the temperature of a liquid in equilibrium with its vapor, as for example, water in boiling equilibrium with steam, is a function of the pressure to which the system is subjected and that the temperature of the liquid in such instances may be controlled by regulating the pressure on the vessel containing the liquid and vapor, as in the case of conventional boilers. In the operation of conventional boilers, the pressure of the steam produced has sometimes been used to regulate the supply of fuel to the burners, increasing fuel if there is a differential loss of pressure, and decreasing fuel in the event of a differential gain in pressure. Alternatively, maintaining a pre-set back pressure on the boiler's steam and allowing only excess steam to be vented from the boiler, produces a constant temperature operation of the boiler and constant temperature steam production, although the volume of steam produced may vary with the boiler fuel supply.

Despite the advantages and ease of regulation of a water-steam heat exchange system, such systems have generally not been utilized in connection with carbon black reactors since the liquid water would need to be maintained in the temperature range of approximately 350°–700° F, corresponding to a pressure of from about 135 p.s.i. to about 3,000 p.s.i., absolute. Such high pressures are not practical or desirable for vessels, such as carbon black reactors, having diameters of 10 to 30 inches and which would not otherwise be subjected to any but the mildest of pressure stresses.

It is accordingly the primary object of the present invention to provide a method and apparatus for controlling surface temperature of a body such as a carbon black reactor without subjecting the body to high pressure fluids.

Another object is to provide such a system in which the heat removed from the body is utilized to boil water and generate steam, the pressure of which may be used to regulate the operation of the heat exchange system.

Another object is to provide such a system which utilizes a first heat exchange liquid with a high boiling point and at approximately atmospheric pressure to remove heat from the body being cooled, circulates such first heat exchange liquid to a second heat exchanger where it is used to convert water into steam and regulates the pressure of the steam produced, as well as the temperatures of the water and first heat exchange liquid, in response to the temperature of the body being cooled.

These and other objects and advantages of the system will become apparent from the accompanying drawing and the following specification and claims.

The single FIGURE of the drawing depicts in somewhat diagrammatic form a preferred embodiment of the temperature control apparatus of the present invention being used to regulate the surface temperature of a portion of the outer metal shell of a furnace-type carbon black reactor, shown in vertical section.

In the preferred embodiment of the invention, a first heat exchange liquid having a relatively high boiling point at approximately atmospheric pressure is circulated in direct contact with the outer surface of the body being cooled to absorb heat from the body. Such first heat exchange liquid can preferably operate at temperatures in the range of 300°–700° F at approximately atmospheric pressure without boiling. One such fluid is marketed by the Monsanto Chemical Company under the trademark "Therminol 77".

The first heat exchange fluid is then circulated to a second heat exchanger containing a second heat exchange liquid having a lower boiling point and the heat is transferred from the first liquid to the second to cause the second liquid to boil and produce vapor. Preferably the second heat exchange fluid will be water and its vapor will be steam. Escape of the steam generated in the second heat exchanger, or boiler, is regulated by a valve or other pressure control means so that the pressure in the second heat exchanger can be controlled. As the steam pressure increases, the temperature of the boiling water also increases. Conversely, as the steam pressure is reduced, the temperature of the boiling water will fall correspondingly. The temperature of the first heat exchange liquid circulating between the body being cooled and the second heat exchanger will similarly rise and fall along with the steam pressure in the second heat exchanger. As the boiling water in the heat exchanger increases in temperature, the temperature differential between the water and the first heat exchange liquid will decrease and less heat will be transferred from the liquid during its passage through the second heat exchanger. Consequently it will return to the first heat exchanger and contact the body being cooled at a higher temperature, removing less heat from the body being cooled so that the body's temperature will also rise. Conversely, lower steam pressure in the second heat exchanger will reduce the temperature of the circulating first heat exchanger liquid and remove correspondingly more heat from the surface of the body being cooled per unit of time. By controlling the pressure of the steam in the second heat exchanger in response to the temperature of the body being cooled, completely automatic temperature control may be maintained.

FIG. 1 illustrates a preferred embodiment of the invention in which the temperature of the outer metal shell of a furnace-type carbon black reactor is regulated utilizing the method and apparatus of the invention. A conventional carbon black reactor 10 includes an outer metallic shell 12 lined with suitable refractory material 14. The refractory material is of normal thickness, as indicated at 14a, in the combustion zone and a portion of the reaction zone; but there is a reduced thickness, as shown at 14b, throughout the remainder of the reaction and quench zones.

The portion of the reactor shell 12 for which the thinner refractory lining 14b is provided is surrounded by a first heat exchanger 16 covered by suitable insulating material 18. The first heat exchanger 16 is formed by a metal shell 20 concentric with the reactor shell 12 and partitions 22 which extend radially between the reactor shell 12 and the concentric heat exchanger shell 20 to provide a plurality of fluid passageways 24. Many forms of passageways are available from the extensive art of heat exchange. Preferably, the partitions 22 may be formed by a single member extending radially and spirally around the shell 12 so that fluid passageways 24 are formed in a continuous spiral. An inlet 26 and exit 28 from the heat exchanger 16 are provided so that a first heat exchange liquid 29 may enter the heat exchanger through inlet 26 circulate through the heat exchanger in contact with the reactor shell 12 to remove heat therefrom and exit from the heat exchanger through outlet 28. Suitable conduit means 30 are provided for circulating the first heat exchange liquid from the first heat exchanger 16 to a second heat exchanger 32 and back from the second heat exchanger 32, through circulating pump 34 to the inlet 26 to the first heat exchanger 16. In the second heat exchanger 32, suitable heat exchange means are provided, as indicated diagrammatically be the heat exchange coil 36, for transferring heat from the first heat exchange liquid 29 to the second heat exchange liquid, preferably water 37, maintained in the second heat exchanger 32 at a level covering the coil 36. Heat transferred from the first heat exchange fluid to the water will cause the water to boil, producing steam 39 which is present in the second heat exchanger 32 above the level of the water 37.

The second heat exchanger 32 is provided with an inlet 38 and an outlet 40 so that water may be supplied to the heat exchanger 32 and the generated steam vented therefrom. Water is supplied through a conduit 42 by means of a valve 44 which is preferably of a type which will automatically maintain a predetermined level of water in the heat exchanger 32. As water in the heat exchanger is converted to steam and vented, additional make-up water will be supplied through valve 44, always maintaining the level of water in the exchanger 32 above the heat exchange coils 36.

Steam generated in the exchanger 32 is vented through outlet 40 into a suitable conduit 46 through which it is preferably conveyed to another location where it is used to perform useful work. Means are provided for controlling the pressure in the second heat exchanger 32 to thereby control the temperature of the second heat exchange liquid (water 37). Preferably such pressure control means comprise valve means 48 in the steam conduit 46 which may be adjusted to regulate the back pressure of steam in the second heat exchanger 32 to allow such steam to escape as will vary the pressure to maintain the predetermined temperature on the reactor shell. Operation of the valve 48 is controlled by a conventional valve operator 50 in response to the temperature sensed by thermocouple 52 located at the inner surface of the carbon black reactor shell 12 and connected to the operator 50 by a suitable electrical connection 54. The valve operator means 50 operates to partially close valve 48 and increase the pressure of the steam in heat exchanger 32 in response to a decrease in the temperature of the reactor shell, as sensed by the thermocouple 52, and to open the valve 48 to decrease the pressure in the second heat exchanger 32 in response to an increase in the temperature of reactor shell 12 above its desired point.

As explained above, this will automatically maintain the temperature of the reactor shell within a desired range since an increase in the steam pressure in heat exchanger 32 will increase the temperature of the water 37, resulting in less heat being removed from the circulating first heat exchange liquid 29, which will then return to the first heat exchanger 16 at a higher temperature. The resulting drop in temperature differential between the reactor shell 12 and the first heat exchange liquid will result in less heat being removed from the reactor so that its temperature will begin to increase. When the increased temperature reaches the desired maximum, the operator 50 will partially open the valve 48 to decrease the pressure in the second heat exchanger, resulting in lower temperatures for the water 37 and first heat exchange liquid 29 so that the reactor shell 12 will be cooled at an increased rate to a lower temperature and start the control cycle over.

It will be readily understood that the same method and apparatus could be employed on other conduits and vessels, with or without interior refractory lining, to maintain a constant temperature of the metal shell.

The drawing, disclosure and description of the invention are illustrative thereof, and various changes in the size, shape and materials of construction may be made within the scope of the appended claims without departing from the spirit of the invention.

What is claimed is:

1. A method for automatically controlling the temperature of a body while removing heat therefrom comprising:

removing heat from said body with a first heat exchange liquid circulating between a first heat exchanger in contact with said body and a second heat exchanger spaced from said body;

removing heat from said first heat exchange liquid by partial vaporization of a second heat exchange liquid in said second heat exchanger;

controlling the pressure in said second heat exchanger by restricting the escape therefrom of the vapor of said second heat exchange liquid;

sensing the temperature of said body; and adjusting the pressure of said vapor in said second heat exchanger in inverse relationship to changes in the temperature of said body to thereby maintain said body within a predetermined temperature range.

2. The method according to claim 1 wherein the pressure of said vapor in said second heat exchanger is increased as the temperature of said body decreases.

* * * * *